US010721060B1

(12) United States Patent
Kaizer et al.

(10) Patent No.: US 10,721,060 B1
(45) Date of Patent: Jul. 21, 2020

(54) DOMAIN NAME BLOCKCHAIN USER ADDRESSES

(71) Applicant: VERISIGN, INC., Reston, VA (US)

(72) Inventors: Andrew Kaizer, Arlington, VA (US); Swapneel Sheth, Fairfax, VA (US)

(73) Assignee: VERISIGN, INC., Reston, VA (US)

( * ) Notice: Subject to any disclaimer, the term of this patent is extended or adjusted under 35 U.S.C. 154(b) by 197 days.

(21) Appl. No.: 16/024,488

(22) Filed: Jun. 29, 2018

(51) Int. Cl.
*H04L 29/06* (2006.01)
*H04L 9/08* (2006.01)
*H04L 9/30* (2006.01)

(52) U.S. Cl.
CPC .............. *H04L 9/0825* (2013.01); *H04L 9/30* (2013.01)

(58) Field of Classification Search
None
See application file for complete search history.

(56) References Cited

U.S. PATENT DOCUMENTS

| | | |
|---|---|---|
| 2011/0296440 A1 | 12/2011 | Laurich et al. |
| 2012/0011360 A1 | 1/2012 | Engels et al. |
| 2015/0278820 A1 | 10/2015 | Meadows |
| 2016/0292672 A1 | 10/2016 | Fay et al. |
| 2017/0180134 A1* | 6/2017 | King ................. H04L 9/3268 |
| 2017/0310484 A1 | 10/2017 | Kaliski, Jr. et al. |
| 2017/0324738 A1* | 11/2017 | Hari ..................... H04L 63/08 |
| 2017/0330174 A1* | 11/2017 | Demarinis ............ G06Q 40/04 |
| 2017/0346833 A1* | 11/2017 | Zhang .................. H04L 9/3239 |
| 2018/0262493 A1* | 9/2018 | Andrade ............. H04L 63/0861 |
| 2018/0287997 A1 | 10/2018 | Li et al. |
| 2019/0121988 A1* | 4/2019 | van de Ruit .......... G06F 21/602 |
| 2019/0166085 A1* | 5/2019 | Li ......................... H04L 61/103 |
| 2020/0021446 A1* | 1/2020 | Roennow ............ H04L 63/0478 |

FOREIGN PATENT DOCUMENTS

WO    2018007828 A2    1/2018

OTHER PUBLICATIONS

Nick Johnson, "How to claim your DNS domain on ENS", The Ethereum Name Service, Nov. 11, 2017, https://medium.com/the-ethereum-name-service/how-to-claim-your-dns-domain-on-ens-e600ef2d92ca, accessed Jun. 29, 2018, pp. 1-4.

(Continued)

*Primary Examiner* — Shin-Hon (Eric) Chen
(74) *Attorney, Agent, or Firm* — MH2 Technology Law Group, LLP

(57) ABSTRACT

Techniques for DNS registry facilitated assignment of a DNS domain name registered to a registrant as a blockchain user address in a blockchain network are presented. The techniques can include providing, by a DNS registry, a public key and a computer executable registry signature verification program configured to use the public key to validate signatures made using the private key for addition to a block in a blockchain of the blockchain network. The techniques can also include receiving a request for a proof of registrar of record, and providing a proof of registration message, such that the registry signature verification program validates the signature using the public key, and the blockchain network receives and stores in the blockchain an association between the domain name and an existing blockchain user address for the registrant.

21 Claims, 6 Drawing Sheets

(56) References Cited

OTHER PUBLICATIONS

International Search Report and Written Opinion cited in corresponding International Application No. PCT/US2019/038447 dated Sep. 30, 2019, pp. 1-15.
Moosavi. "Rethinking Certificate Authorities: Understanding and Decentralizing Domain Validation," Concordia Institute for Information Systems Engineering, Montreal, Quebec, Canada, Apr. 2, 2018, [retrieved on Aug. 25, 2019]. Retrieved from the Internet: URL:https://pdfs.semanticscholar.org/7e38/b0c0e6t7066de9821b8fab6a489a 79907 44f.pdf pp. 1-92.
Domraider. "ICO Whitepaper," www.domraider.io, SIRET 79417114000013 [retrieved on Aug. 25, 2019]. Retrieved rom the Internet: URL:https://s3-eu-west-1.amazonaws.com/domraider/domraider/DomRaider+ICO+Whitepaper+EN.pdf pp. 1-99.
Tarasov. "Internet Voting Using Zcash," University of Dublin, Trinity College, May 2017 [retrieved on Aug. 25, 2019]Retrieved from the Internet: URL:https://scss.tcd .ie/publications/theses/diss/20 17/TCD-SCSS-DISSERTA TION-2017-015.pdf pp. 1-89.

\* cited by examiner

DOMAIN NAME BLOCKCHAIN USER ADDRESSES

FIELD

This disclosure relates generally to blockchains, and, more particularly, blockchain user addresses.

BACKGROUND

The domain name system (DNS) is a hierarchical distributed naming system for resources provided by computer servers that are connected to the internet. It associates domain names to numeric internet protocol (IP) addresses of internet resources. The DNS thus allows computers and humans to access networked resources, including web pages, using domain names.

Domain names have levels, e.g., for example.com, the "com" portion is referred to as the "top-level domain name", and the "example" portion is referred to as the "second-level domain name". This convention may be continued indefinitely, e.g., for the domain name sub.example.com, the "sub" portion is referred to as a "third-level domain name". As used herein, unless otherwise qualified by specifying the level, the term "domain name" means full domain name, including a top-level domain name, a second-level domain name, and possibly additional levels of domain names.

A DNS "registry" is an authoritative, master database of all domain names registered in a top-level domain or other domain in which domain names can be registered. A registry includes many hardware computer servers operably coupled to the internet. For ease of discussion, a registry is identified with its hardware computer servers unless otherwise specified or clear from context. Internet users generally interact with the registry via intermediaries such as registrars.

"Registrars" are companies that register ownership of domain names by entities known as "registrants". Registrars compete with one another to register domain names for registrants through the registry. That is, an internet user interacts with a registrar to obtain ownership of a domain name, thereby becoming a registrant for the domain. Registrars typically include many hardware computer servers. For ease of discussion, a registrar is identified with its hardware computer servers unless otherwise specified or clear from context. Further, for ease of discussion, a registrant is identified with its hardware client computer unless otherwise specified or clear from context.

Trusted "service providers" provide DNS-related services but are not official DNS registries or other official DNS entities. For example, web hosting providers provide the web server computers that serve the web pages associated with domain names. These entities are trusted service providers in the DNS context. As another example, consumer DNS resolvers provide DNS resolution services separate from the official distributed database of DNS data maintained by the official DNS registries. Such DNS operators are also a type of trusted service provider. As yet another example, trusted service providers in the DNS context may act on a user's behalf, e.g., to enable DNSSEC for a registrant's domain. Other trusted service providers exist.

A "blockchain" is a decentralized, distributed, electronic ledger that records transactions, including but not limited to cryptocurrency transactions, or other information, as described presently. In general, a blockchain takes the form of a distributed readable and writeable computer interpretable data structure, stored in various computers (i.e., nodes) in the blockchain network (e.g., a cryptocurrency network).

A blockchain is constructed from individual logical blocks. Each block may include any, or a combination, of: a timestamp representing a time of the block's creation, a cryptographic hash of an identification of the previous block, and a payload, which includes data that may represent transactions or other information. The data in the blockchain payload may represent, for example, for each of a plurality of transactions, a transaction identifier, a transaction amount, and the address associated with the receiving party (more precisely, associated with the receiving party's public key). Each participant in the blockchain network is associated with a cryptographic asymmetric key pair, referred to as the participant's "blockchain key pair", consisting of a public key (e.g., usable by the participant to receive cryptocurrency) and a private key (e.g., usable by the participant to send cryptocurrency). In particular, the public key is associated with (e.g., usable to derive via cryptographic hash) a "blockchain user address" of the participant, and the private key is owned or controlled—and kept secret—by the blockchain network participant. A first blockchain participant may receive cryptocurrency from a second blockchain participant, for example, that utilizes a cryptocurrency blockchain user address of the first blockchain participant. For brevity, blockchain user addresses are referred to as "addresses" herein when clear from context.

SUMMARY

According to various embodiments, a domain name system (DNS) registry facilitated method of assigning a DNS domain name registered to a registrant as a blockchain user address in a blockchain network is disclosed. The method includes: obtaining, by the DNS registry for the domain name, a cryptographic asymmetric proof key pair comprising a public key and a private key; providing, by the DNS registry, the public key and a computer executable registry signature verification program for addition to a block in a blockchain of the blockchain network, wherein the registry signature verification program is configured to use the public key to validate signatures made using the private key; receiving, by the DNS registry, a request for a proof of registrar of record for the domain name from a registrar of record for the domain name, wherein the request comprises the domain name; confirming, by the DNS registry, that the registrar is a registrar of record for the domain name; providing, by the DNS registry, a proof of registration message, wherein the proof of registration message comprises a signature by the private key and confirms that the registrar is a registrar of record for the domain name; whereby the registry signature verification program validates the signature using the public key, and whereby the blockchain network receives and stores in the blockchain an association between the domain name and an existing blockchain user address for the registrant.

Various optional features of the above method embodiments include the following. The method may further include: using the private key, signing, by the DNS registry, a top level domain name corresponding to the domain name and a blockchain address of the registry signature verification program to form a message; and providing the message to the blockchain network for inclusion in the blockchain. The providing, by the DNS registry, the proof of registration message may include providing, by the DNS registry, the domain name, the existing blockchain user address for the registrant, and the proof of registration message to the blockchain network for processing by the registry signature verification program. The request may further include the existing blockchain user address for the registrant. The registry signature verification program may be further configured to await confirmation sent from an electronic wallet of the registrant before requesting assignment of the domain name as a blockchain user address of the registrant in the blockchain network. The method may further include: storing in persistent memory a voiceprint of a contact for a registration of the domain name; receiving a request to verify a new voiceprint; verifying the new voiceprint by matching to the voiceprint of the contact for the registration of the domain name; and providing a voiceprint verification to the registrar.

According to various embodiments, a domain name system (DNS) registrar facilitated method of assigning a DNS domain name registered to a registrant as a blockchain user address in a blockchain network is disclosed. The method includes sending, by a DNS registrar for the domain name, and to a DNS registry for the domain name, a request for a proof of registrar of record for the domain name, wherein the request comprises the domain name; receiving, by the DNS registrar, and from the DNS registry, a proof of registration message, wherein the proof of registration message comprises a signature by a private key of the registry and confirms that the DNS registrar is a registrar of record for the domain name; and sending, by the DNS registrar, and to the blockchain network, a request to assign the domain name as a blockchain user address for the registrant, whereby a node in the blockchain network validates the signature using a private key corresponding to the public key and stores an association between the domain name and an existing blockchain user address for the registrant.

Various optional features of the above method embodiments include the following. The method may include, prior to the sending the request for a proof of registrar of record for the domain name: receiving, by the DNS registrar for the domain name, a request for an access token, wherein the request comprises a browser redirection from a service provider from which the registrant has requested that the domain name be assigned as a blockchain user address of the registrant in the blockchain network; authenticating, by the DNS registrar, the registrant; responding to the request, by the DNS registrar, with an access token and a redirection back to the service provider; and receiving, by the DNS registrar, the access token, the domain name, and an existing blockchain user address for the registrant. The request may further include the existing blockchain user address for the registrant. The sending, by the DNS registrar, and to the blockchain network, the request to assign the domain name as a blockchain user address for the registrant, may further include sending the request to a node in the blockchain network that comprises a computer executable registry signature verification program configured to validate registry signatures and receive an authorization message originated by an electronic wallet of the registrant prior to it sending a request to assign the domain name as a blockchain user address for the registrant in the blockchain network. The method may further include, prior to the sending the request for a proof of registrar of record for the domain name, receiving, by the DNS registrar, and from the registrant, a request to assign the domain name as a blockchain user address of the registrant in the blockchain network. The request to assign the domain name as a blockchain user address of the registrant in the blockchain network may be derived from an audio command provided by the registrant.

According to various embodiments, a domain name system (DNS) registry system configured to assign a DNS domain name registered to a registrant as a blockchain user address in a blockchain network is disclosed. The system includes at least one electronic server computer communicatively coupled to the internet and to an electronic persistent storage device, the electronic persistent storage device storing a cryptographic asymmetric proof key pair comprising a public key and a private key, the at least one electronic server configured to provide the public key and a computer executable registry signature verification program to the blockchain network for addition to a block in a blockchain of the blockchain network, wherein the registry signature verification program is configured to use the public key to validate signatures made using the private key; and an Extensible Provisioning Protocol (EPP) interface communicatively coupled to the internet and the at least one electronic server computer and configured to respond to a request for a proof of registrar of record for the domain name, wherein the request comprises the domain name, received from a registrar of record for the domain name, by confirming that the registrar is a registrar of record for the domain name and then providing a proof of registration message confirming that the registrar is a registrar of record for the domain name, wherein the proof of registration message comprises a signature by the private key, whereby the blockchain network receives and stores in the blockchain an association between the domain name and an existing blockchain user address for the registrant after the registry signature verification program obtains and validates the signature using the public key.

Various optional features of the above embodiments include the following. The at least one electronic server computer may be further configured to sign, using the private key, a top level domain name corresponding to the domain name and a blockchain address of the registry signature verification program to form a message and provide the message to the blockchain network for inclusion in the blockchain. The EPP interface may be further configured to respond to the request for a proof of registrar of record for the domain name by confirming that the registrar is a registrar of record for the domain name and then providing the proof of registration message, the domain name, and the existing blockchain user address for the registrant to the blockchain network for processing by the registry signature verification program. The request may further include the existing blockchain user address for the registrant. The registry signature verification program may be further configured to await confirmation sent from an electronic wallet of the registrant before requesting assignment of the domain name as a blockchain user address of the registrant in the blockchain network. The registry may be further configured to: store in persistent memory a voiceprint of a contact for a registration of the domain name; receive a request to verify a new voiceprint; verify the new voiceprint by matching to the voiceprint of the contact for the registration of the domain name; and provide a voiceprint verification to the registrar.

According to various embodiments, a domain name system (DNS) registrar system configured to assign a DNS domain name registered to a registrant by the registrar as a blockchain user address in a blockchain network is disclosed. The DNS registrar system includes at least one electronic server computer communicatively coupled to the internet and configured to perform a method comprising: sending, to a DNS registry for the domain name, a request for a proof of registrar of record for the domain name, wherein the request comprises the domain name; receiving, from the DNS registry, a proof of registration message confirming that the DNS registrar is a registrar of record for the domain name, wherein the proof of registration message comprises a signature by a private key of the registry; and sending, to the blockchain network, a request to assign the domain name as a blockchain user address for the registrant, whereby a node in the blockchain network validates the signature using a public key corresponding to the public key and stores an association between the domain name and an existing blockchain user address for the registrant.

Various optional features of the above system embodiments include the following. The at least one electronic server computer may be further configured to perform, prior to the sending the request for a proof of registrar of record for the domain name: receiving a request for an access token, wherein the request comprises a browser redirection from a service provider from which the registrant has requested that the domain name be assigned as a blockchain user address of the registrant in the blockchain network; authenticating the registrant; responding to the request with an access token and a redirection back to the service provider; and receiving, from the service provider, the access token, the domain name, and an existing blockchain user address for the registrant. The request may further include the existing blockchain user address for the registrant. The sending, to the blockchain network, the request to assign the domain name as a blockchain user address for the registrant, may further include sending the request to a node in the blockchain network that comprises a computer executable registry signature verification program configured to validate registry signatures and receive an authorization message originated by an electronic wallet of the registrant prior to it sending a request to assign the domain name as a blockchain user address for the registrant in the blockchain network. The at least one electronic server computer may be further configured to perform, prior to the sending the request for a proof of registrar of record for the domain name, receiving, from the registrant, a request to assign the domain name as a blockchain user address of the registrant in the blockchain network. The request to assign the domain name as a blockchain user address of the registrant in the blockchain network may be derived from an audio command.

BRIEF DESCRIPTION OF THE DRAWINGS

Various features of the embodiments can be more fully appreciated, as the same become better understood with reference to the following detailed description of the embodiments when considered in connection with the accompanying figures, in which.

DESCRIPTION OF THE EMBODIMENTS

Figure 1:
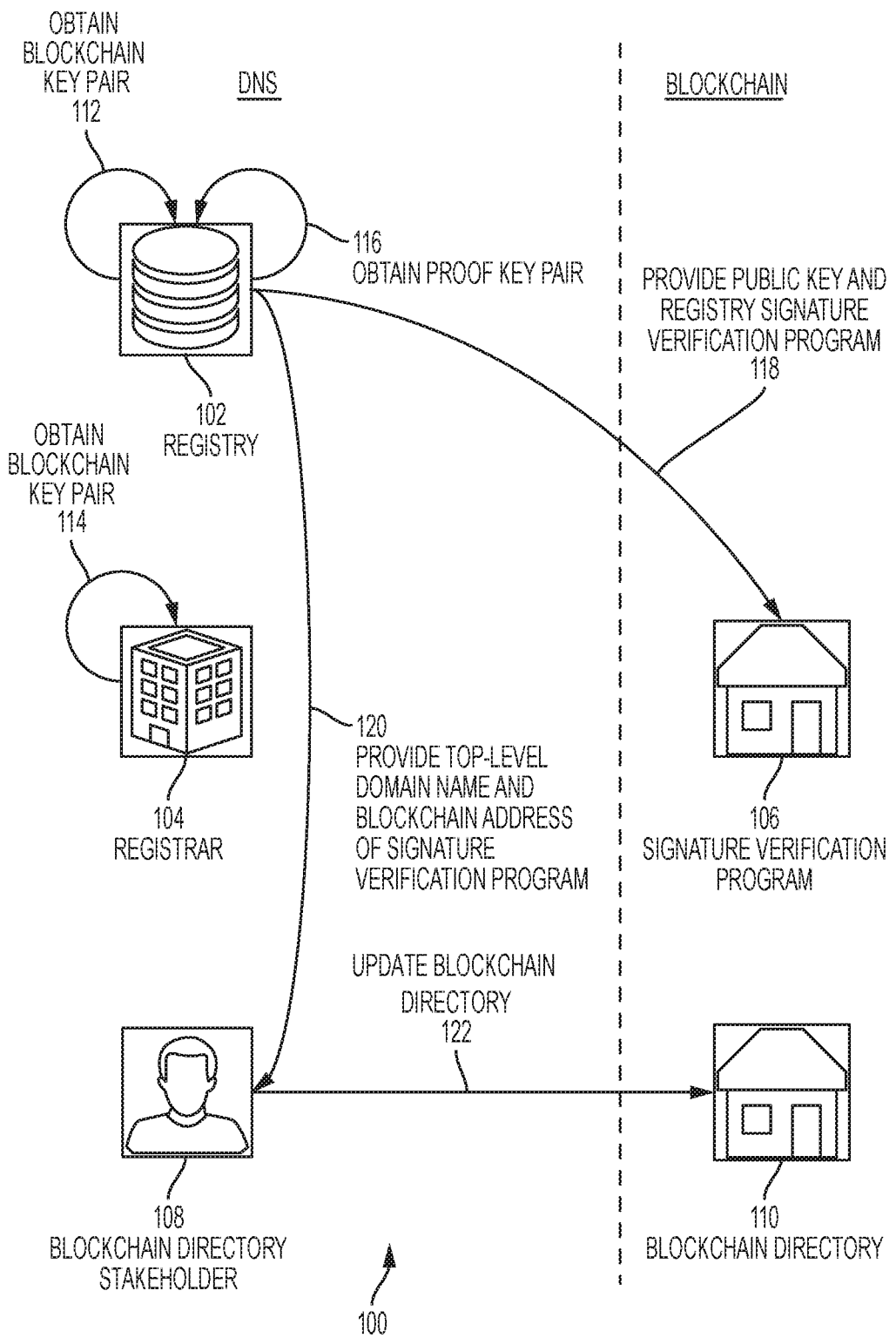
FIG. 1 is a hybrid diagram of a setup method to prepare for assigning a DNS domain name registered to a registrant as a blockchain user address in a blockchain network according to various embodiments.

Reference will now be made in detail to example implementations, illustrated in the accompanying drawings. Wherever possible, the same reference numbers will be used throughout the drawings to refer to the same or like parts. In the following description, reference is made to the accompanying drawings that form a part thereof, and in which is shown by way of illustration specific exemplary embodiments in which the invention may be practiced. These embodiments are described in sufficient detail to enable those skilled in the art to practice the invention and it is to be understood that other embodiments may be utilized and that changes may be made without departing from the scope of the invention. The following description is, therefore, merely exemplary.

I. Introduction

Some embodiments provide the ability to use domain names purchased in the traditional Domain Name System (DNS) environment (e.g. at a registrar) in a blockchain environment. For example, if a registrant owns example-.com, they may wish to be able to use it as their blockchain user address. This enables a human friendly way to interact with other blockchain participants by using domain names as addresses instead of numbers, such as public keys or hashes thereof. Further, it permits blockchain participants to utilize their web presence, e.g., example.com, as their blockchain presence.

Some embodiments leverage information known by each party—registry, registrar, and registrant—to prove domain name ownership, which is then utilized by a registrant to securely claim a domain name as their blockchain user address. At a high level, some embodiments may include two phases. First, a setup phase creates and/or provisions components in the DNS and blockchain environments. Second, an execution phase occurs where a domain name is pushed from the DNS environment into the blockchain environment, e.g., at the request of the registrant.

Embodiments include many innovations, benefits, and technical advantages. For example, some embodiments establish a direct approach for registrants to utilize their DNS domain names in a blockchain network. To that end, some embodiments insert an executable program, a registry signature verification program, described in detail herein, into the blockchain. The registry signature verification program is provided and maintained by a respective registry for the associated top-level domain.

As another example, some embodiments provide a way for the registry signature verification program to verify the claim of domain name ownership via a cryptographic asymmetric key system. This verification may ensure that only registry approved domain names can be added to the blockchain. This is advantageous because many blockchains do not allow for external network connections to be established to fetch or retrieve information, e.g. a public key to use for validation purposes. External network connections are prevented because external sources may risk breaking the blockchain nodes' ability to rely on the same information, e.g. an external network may go offline or provide different answers to different nodes which would break the blockchain network's ability to reach consensus. The cryptographic asymmetric key approach resolves this by supplying a public key in such a way that the entire blockchain has access to it. For example, in some embodiments, the public key is provisioned during the creation of the registry signature verification program. Therefore, confusion is avoided in the blockchain network about how to validate signed messages, and a consensus can be reached.

As yet another example, some embodiments establish and utilize a new Extensible Provisioning Protocol (EPP) extension, referred to herein as the "registry of record proof", or utilize an existing domain object extension and associated commands if such extension and commands provide the disclosed functionality. According to some embodiments, this extension may include a single command, e.g., INFO, that accepts as arguments a domain name and a blockchain address. A registry receiving a properly formed INFO command may compare the registrar of record for the domain name as recorded in the registry database with the registrar that is making the particular INFO call. If a match is found, the registry may sign the domain name and blockchain address and pass the signed message back to the requesting registrar. Otherwise, the registry may return an error. This process proves that the registry, which is the trusted authority for all of a top-level domain's domain names, has confirmed that a particular registrar's request is valid.

According to an embodiment, usage of DNS Security (DNSSEC) is not required. According to an embodiment, delegating a domain name into a zone is not required.

These and other features and advantages are described in detail herein.

II. Setup Phase

FIG. 1 is a hybrid diagram of a setup method 100 to prepare for assigning a DNS domain name registered to a registrant as a blockchain user address in a blockchain network according to various embodiments. Setup method 100 may be performed to establish and configure the hardware, software, and protocol components used to perform the methods shown and described below in reference to FIGS. 2-5. The left hand side of the diagram depicts the DNS environment, and the right hand side depicts the blockchain environment.

Setup method 100 may begin with registry 102 obtaining 112 a blockchain key pair and registrar 104 obtaining 114 a blockchain key pair. These blockchain key pairs are the registry's 102 and the registrar's 104 blockchain keys, which they may use to perform blockchain transactions. According to an embodiment, registry 102 and registrar 104 may obtain respective addresses instead of respective blockchain user public keys according to some embodiments. Registry 102 and registrar 104 may obtain their respective blockchain key pairs (or respective private keys and addresses) by generating them themselves, or by acquiring them from a different entity, such as a certificate authority.

According to some embodiments, registry 102 and registrar 104 obtain their respective key pairs (or respective private keys and addresses) through the use of, or by acquiring, respective electronic wallets. As used herein, a "wallet" is a computer executable software program or application that facilitates interactions with a blockchain network. The wallet may execute on a user device such as a personal computer or a smart phone. The wallet may be used in cryptocurrency blockchain networks to facilitate the sending and receiving of cryptocurrency with other participants in the network. A standard wallet may have built in user-callable functionality to generate blockchain key pairs (or private keys and addresses) and send and receive cryptocurrency. The wallet, as contemplated herein, may have additional functionality as described further herein.

After registry 102 and registrar 104 have obtained their respective key pairs, according to setup method 100, registry 102 may add support for a new EPP extension referred to herein as a "registrar of record proof". The registrar of record proof may be used to prove that a given registrar is the registrar of record for a particular specified domain, i.e., that a registrant used the particular registrar that requests the registrar of record proof to register their domain name. To support such an EPP extension, registry 102 may utilize facilities of EPP and eXtensible Markup Language (XML) to configure its existing EPP interface to handle registrar of record proof requests—using either a new or and existing domain object extension and associated commands. Further, registry 102 obtains 116 (e.g., generates) a new cryptographic asymmetric key pair, referred to herein as the "proof key pair", of which the private key is used to sign the registrar of record proofs. The public key of the proof key pair may be used by registrars to verify that proofs responsive to their registrar of record proof requests came from the exact registry 102 to which they sent the request and have not been altered, e.g., by a man-in-the-middle attack.

In use, once registry 102 establishes registrar of record proof EPP support, a registrar (e.g., registrar 104) may request such a proof from registry 102. Such a request may be formatted using XML according to EPP convention, for example. The request may include a domain name and possibly additional information such as a blockchain address as described further below in reference to FIGS. 2-5. The request itself includes information identifying the originating registrar, such as the Internet Protocol (IP) address of the registrar. To respond to the request, registry 102 first checks whether the registrar that sent the request is the registrar of record for the domain name supplied in the request according to its records. If not, then registry 102 may return an error message. If so, then registry 102 returns a message, referred to herein as the "registrar of record proof" or "proof" if clear from context, containing the domain name and other information provided by the requester (e.g., a blockchain address) that it has signed using the private key from its proof key pair obtained 116 previously.

According to some embodiments, the proof may have an expiration attached to it by the registry. This ensures a replay attack is prevented, e.g. to prevent a previous registrant from claiming the domain name too far into the future when they may have transferred the domain to a different registrant. The time limit is a matter of registry policy, and may be on the order of one, two, three, or more days, or coextensive with the expiration of the domain name's registration.

Note that there is an implied trust between registry 102 and registrar 104. The proof asserts that a specified domain name is managed by a particular registrar. Registry 102 relies on registrar 104 to only act explicitly on behalf of a valid registrant. If registrar 104 is found to be acting negligently, e.g., by claiming names on a blockchain for themselves, then it is likely that the registrar would be punished and/or suffer reputational risk. This threat of punishment and/or reputational risk deters bad or negligent acting by registrar 104.

Next, according to setup method 100, registry 102 provides 118 a computer executable registry signature verification program 106 to the blockchain network for inclusion in a block in the blockchain. Registry signature verification program 106 may be in the form of a blockchain smart contract according to some embodiments. Registry 102 includes a copy of the public key of its proof key pair in the registry signature verification program. In operation, registry signature verification program 106 performs a registry signature verification algorithm defined by its computer executable code. The registry signature verification algorithm accepts as input data that includes at least an electronic signature, determines whether the signature is valid using the public key, and outputs a response indicating whether or not the signature is valid.

1. Input: message that includes electronic signature;
2. Decrypt signature using public key of proof key pair;
3. Check whether decrypted signature is valid (e.g., determine whether hash of message body is identical to decrypted signature);
4. Output: results of determination at step 3.

Example Registry Signature Verification Algorithm

The registry signature verification program 106 on the blockchain serves as the entry point to claim a domain name that is already provisioned in the DNS environment. Once a node in the blockchain adds registry signature verification program 106 to a block in the blockchain per the request of registry 102, registry 102 receives back an address of the blockchain indicating where the registry signature verification program 106 is stored in the blockchain. This address serves as a blockchain address for the registry signature verification program 106 in a manner analogous to the use of public keys of blockchain key pairs (or hashed public keys) for that purpose. Thus, the address received by registry 102 indicating where the registry signature verification program 106 is stored in the blockchain is also referred to herein as a "blockchain user address" or "address" consistent with the use of those terms to refer to public keys or hashed public keys as blockchain addresses.

Next, according to setup method 100, an optional step is to account for blockchain networks that have existing name services. Some blockchain networks permit participants to use names having particular specified formats (but not arbitrary domain names) as their blockchain addresses. Such associations may be held in a "blockchain directory", such as blockchain directory 110. Blockchain directory 110 keeps track of which blockchain addresses have ownership over which names in the blockchain network, that is, the assignments of names to blockchain participants. According to some embodiments, blockchain directory 110 is embodied by, or utilizes, a non-transitory computer executable blockchain name services program stored in a block of the blockchain. According to such embodiments, the blockchain name services program is a smart contract. In operation, the blockchain name services program may accept as input a command to assign a name to a specified blockchain address, along with a specified name, and may store a record of such assignment upon processing such command. Alternately, or in addition, blockchain directory 110 may include or utilize a table of associations between names and blockchain addresses.

For embodiments in which the blockchain network does not include an existing name services framework, such a framework may be added to handle domain names assigned as blockchain addresses per some embodiments. The added framework may include a blockchain name services program as described herein and/or a blockchain directory such as blockchain directory 110.

Thus, according to some embodiments, to account for blockchain networks that have existing name services, registry 102 provides the top-level domain names(s) over which it has registration authority (e.g., the extensions dot com, dot net, dot edu, etc.), along with the blockchain address of the registry signature verification program 106, to the blockchain directory stakeholder 108 (e.g., owner or manager). Blockchain directory stakeholder 108 may then update 122 blockchain directory 110 with the provided information, that is, with information indicating that the top-level domain names are owned, in the blockchain sense, by the registry signature verification program. Blockchain directory stakeholder 108 may perform such an update 122 by passing the top-level domain names(s) over which it has registration authority and the blockchain address of the registry signature verification program 106 to the name services program, which updates a record of the assignment.

Alternately, according to some embodiments, to account for blockchain networks that have existing name services, instead of the providing 120 and the updating 122 described above, registry 102 may submit to the blockchain network for inclusion in the blockchain a message that includes the top-level domain name(s) (e.g., dot com, dot net, dot edu, etc.) for which registration is handled by registry 102 and the blockchain address of the signature verification program 106, signed by the private key of the blockchain key pair of registry 102. The message may be submitted to the blockchain network for inclusion in a block to indicate that registry 102 has, in a sense, conveyed ownership of the top-level domain name to the registry proof verification program at the provided blockchain address, at least for purposes of assigning domain names under the top-level domain name as blockchain user addresses in the blockchain network.

Finally, according to setup method 100, registrar 104 (or a trusted service provider) may add functionality to their website or service to enable domain name registrants to sign in and request a domain name be assigned as their blockchain user address. This may include adding, or reconfiguring an existing, user interface and adding functionality for fetching proofs from registry 102, and may also include functionality for registrar 104 to submit the proof to the blockchain.

The service provides considered herein are trusted by some or all interested parties. As disclosed herein, a user (e.g., domain name registrant) can take actions through any of a variety of trust chains. For example, the user may act through the registrar or registry, which may make changes to the blockchain. Alternately, the user may act through a trusted service provider, e.g., a third party trusted service provider, which may make changes to the blockchain directly, through a registry, through a registrar, or thorough a registrar, which takes actions through the associated registry. In sum, service providers as contemplated herein are trusted to interact with many different entities on behalf of a registrant.

III. Execution Phase

Figure 2:
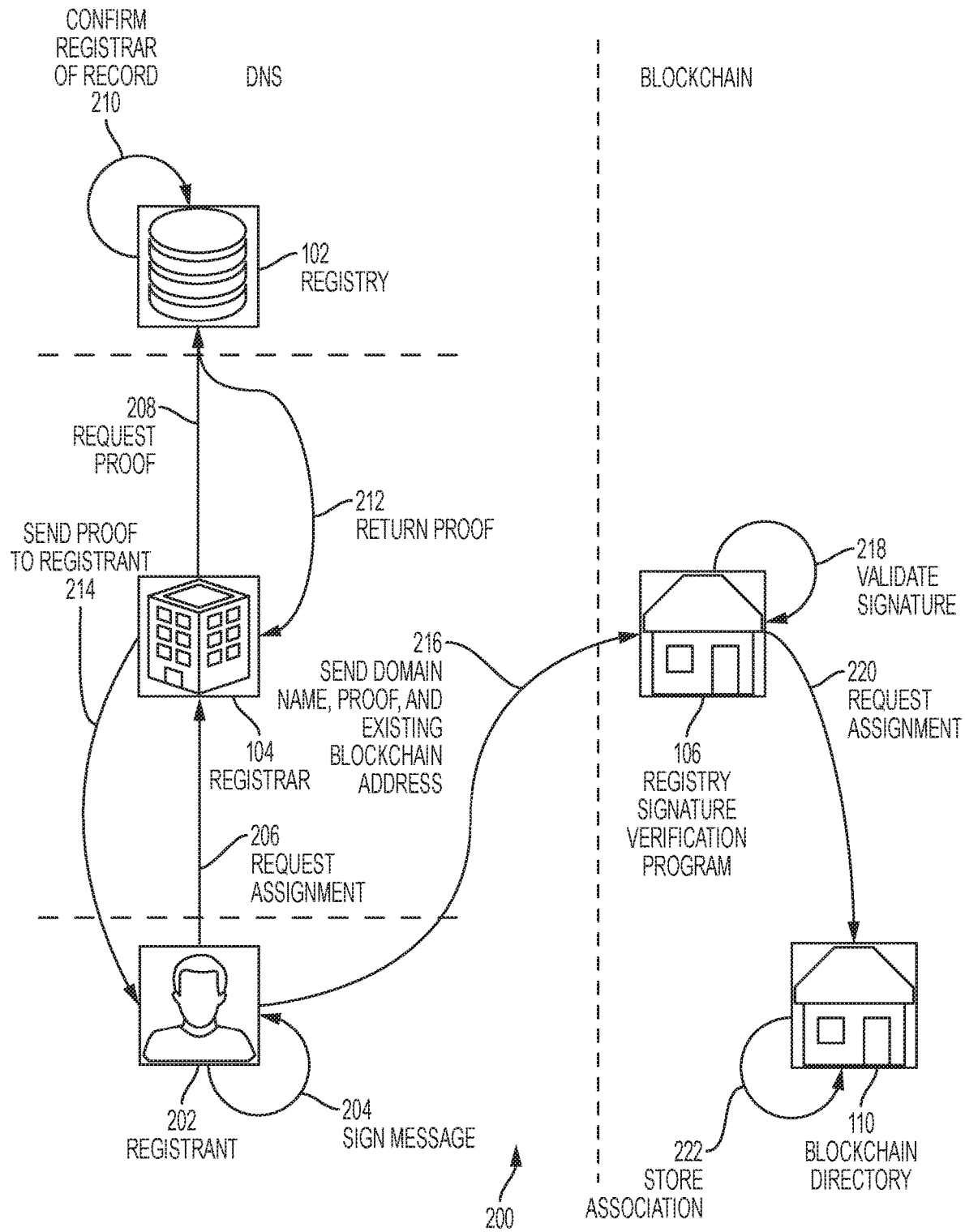
FIG. 2 is a hybrid diagram of a registrant facilitated method for assigning a DNS domain name registered to a registrant as a blockchain user address in a blockchain network according to various embodiments.

FIG. 2 is a hybrid diagram of a registrant facilitated method 200 for assigning a DNS domain name registered to registrant 202 as a blockchain user address in a blockchain network according to various embodiments. For convenience, method 200 is described in reference to the same registry 102, registrar 104, registry signature verification program 106, and blockchain directory 110 as described above in reference to FIG. 1. Method 200 may be initiated by a registrant, such as registrant 202. The actions performed by registrant 202 in method 200 may be performed through or by the registrant's wallet according to some embodiments.

Method 200 may include an optional process of registrant 202 signing 204 their existing, e.g., numeric or alphanumeric, blockchain user address using their blockchain private key to create a proof of blockchain user address ownership. This process may be accomplished any time prior to registrant 202 requesting 206 assignment of a domain name to their existing blockchain user address. Later, the proof of blockchain user address ownership may be passed to registrar 104 to be validated, once registrar 104 receives a message from registrant 202 specifying a domain name and existing blockchain user address and requesting 206 assignment of the specified domain name as the user's specified existing blockchain user address. To validate the proof of blockchain user address ownership at that point, registry 102 may verify the signature using the public key of the user's blockchain key pair and check whether the specified blockchain user address in the message matches the blockchain user address that is signed in the proof.

The domain name assignment method 200 may be initiated by registrant 202 by requesting 206 assignment of a specified domain name that is registered to registrant 202 and, for method 200 optionally, a blockchain address to which to assign the domain name. Registrant 202 may send a request message with this data to registrar 104. The message may also include the proof of blockchain user address ownership and/or an identification of the particular blockchain, e.g., in embodiments that provide method 200 for multiple blockchains. According to some embodiments, registrant 202 initiates the process through a webpage interface provided by registrar 104.

Next, per method 200, registrar 104 requests 208 a registrar of record proof from registry 102. The request may include, for example, the domain name and blockchain user address specified by registrant 202.

Next, per method 200, registry 102 confirms 210 that the registrar that sent the request is the registrar of record for the provided domain name, e.g., using the originating IP address of the request, to identify the requesting registrar. Registry 102 may check the IP address (or other identifier) against its stored registrar records. If a registrar of record match is found, then method 200 proceeds to the next step in the process; otherwise, the process may halt at this stage, possibly after registry 102 returns an error message to registrar 104, which returns a like error message to registrant 202.

Next, per method 200, registry 102 returns 212 a registrar of record proof signed with the private key of the proof key pair obtained 112 during the setup phase shown and described above in reference to FIG. 1. The proof may include <domain name> in the proof's body along with a signature on <domain name>. According to some embodiments, the proof may include the pair <domain name, address> in the proof's body along with a signature on <domain name, address>. The proof is used later by registry signature verification program 106 to verify that the <domain name, address> combination is valid and that assignment of the domain name should be given to the address.

Next, per method 200, registrar 104 sends 214 the proof to registrant 202 per registrant facilitated embodiments as presented herein.

Per method 200, registrant 202 receives the proof and forms a message containing the proof, the domain name, and the address. Registrant 202 may send 216 the message to registry signature verification program 106. This may be accomplished by the registrant's wallet without requiring further involvement by the user or human registrant.

Next, per method 200, registry signature verification program 106 may validate 218 the registry's signature on the proof received from registrant 202 using the public key of the proof key pair provisioned during the setup phase. If not valid, then the process may halt, possibly with an error message conveyed from registry signature verification program 106 back to registrant 202 and/or registrar 104. Otherwise, method 200 proceeds as follows.

Next, per method 200, registry signature verification program 200 may request 220 assignment of the domain name as the registrant's blockchain user address by sending a message to blockchain directory 110. In embodiments where blockchain directory 110 includes an executable program such as a smart contract, the message may be in the form of a command to assign the domain name as registrant's new blockchain user address. According to such embodiments, the command may specify the domain name and the existing blockchain user address of registrant 202.

Next, per method 200, blockchain directory 110 may store 222 an association between the domain name and the existing (now prior) blockchain user address. Such an association may be stored in a table, for example.

According to registrant facilitated method 200, registrant 202 may send the proof, domain name, and existing blockchain user address to registry signature verification program 106. However, according to alternate embodiments, these data may instead be conveyed to registry signature verification program 106 by registry 102 or registrar 104. In general, the conveyance can be done by any entity, such as a trusted service provider, that may have access to the data. Registry signature verification program 106 does not require that the message come from any particular source. Thus, according to embodiments, FIG. 3 depicts a registrar facilitated method 300, and FIG. 4 depicts a registry facilitated method 400.

Figure 3:
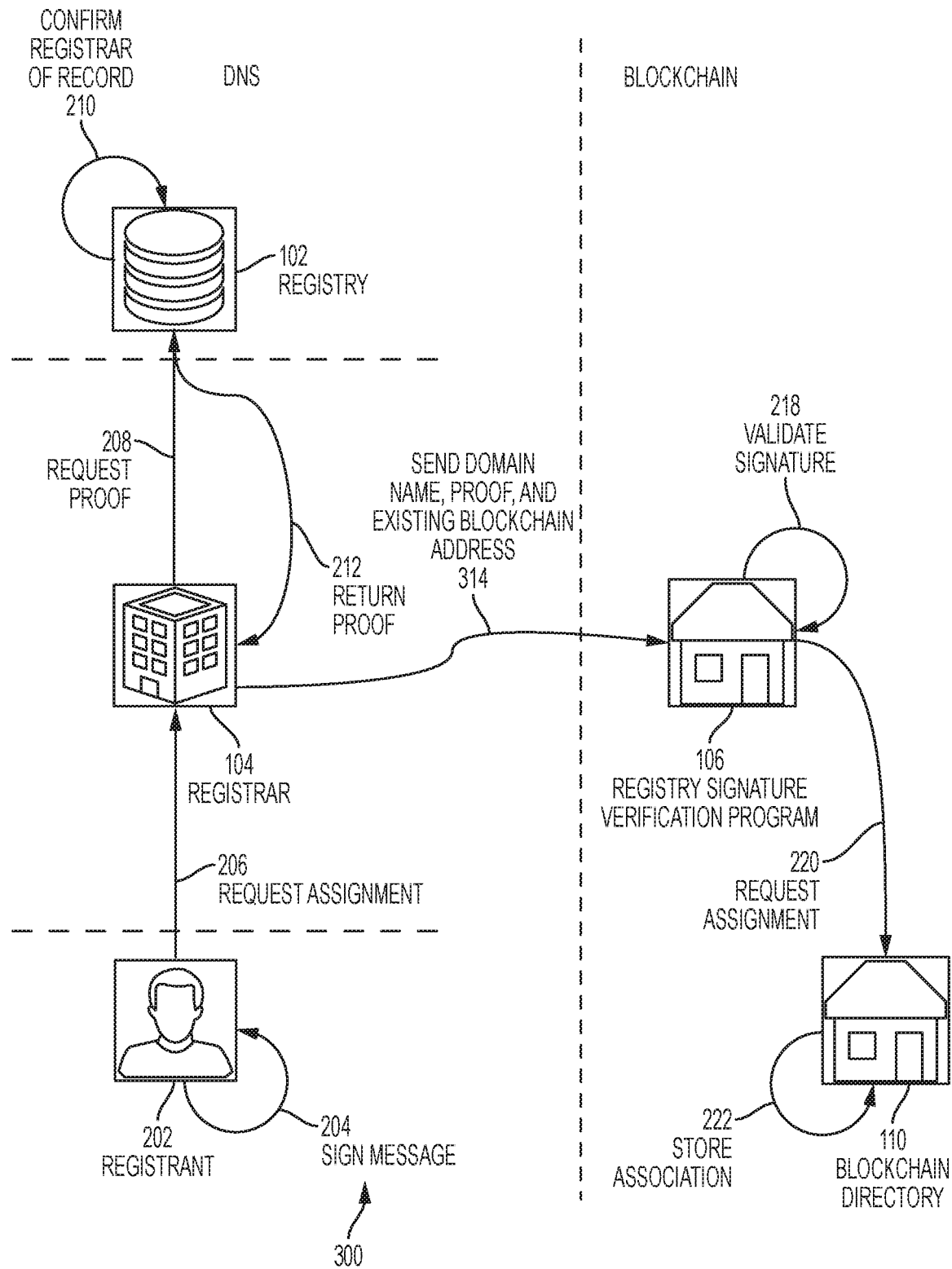
FIG. 3 is a hybrid diagram of a registrar facilitated technique for assigning a DNS domain name registered to a registrant as a blockchain user address in a blockchain network according to various embodiments.
Figure 4:
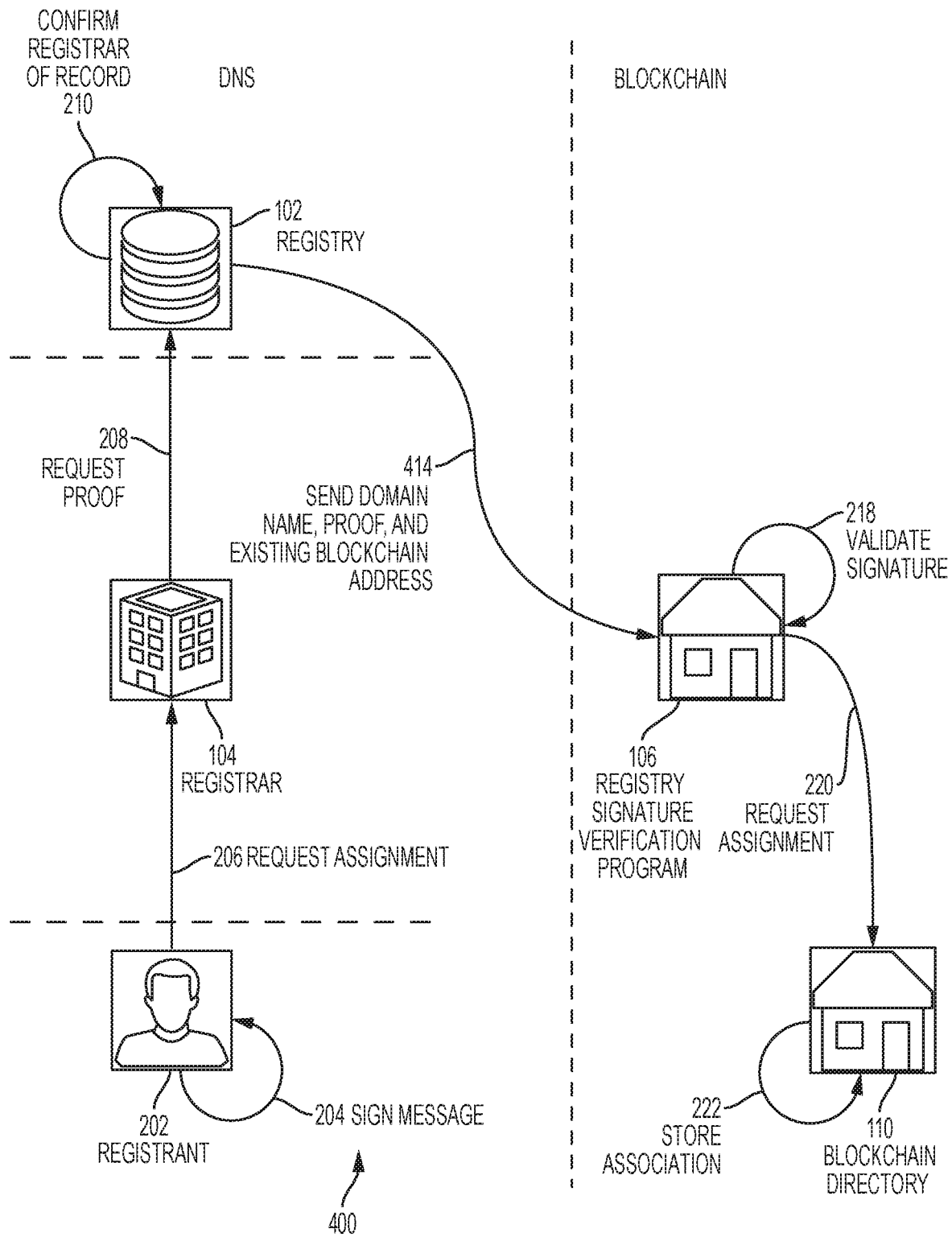
FIG. 4 is a hybrid diagram of a registry facilitated technique for assigning a DNS domain name registered to a registrant as a blockchain user address in a blockchain network according to various embodiments.

FIG. 3 is a hybrid diagram of a registrar facilitated method 300 for assigning a DNS domain name registered to registrant 202 as a blockchain user address in a blockchain network according to various embodiments. The entities and steps depicted in the hybrid diagram that share identifying numerals with the entities and steps depicted in the hybrid diagram of FIG. 2 are described in detail above in reference to FIG. 2. Further, method 300 is essentially identical or similar to method 200 up to the point at which registry 102 returns 212 the proof to registrar 104, except that registrant 202 includes their existing blockchain user address in the request 206 assignment message, which inclusion is optional in method 200. Therefore, description of method 300 proceeds by describing the features that are unique to method 300.

Once registrar 104 receives the proof returned 212 from registry 102, instead of sending 214 the proof to registrant 202 as per method 200, registrar 104 forms a message and sends 314 it to registry signature verification program 106. In particular, registrar 104 forms a message that includes the proof, the domain name, and the address. Registrant 202 sends 216 the message to registry signature verification program 106.

The remaining steps of method 300 are as described above in reference to method 200 of FIG. 2.

FIG. 4 is a hybrid diagram of a registry facilitated method 400 for assigning a DNS domain name registered to a registrant 202 as a blockchain user address in a blockchain network according to various embodiments. Like the hybrid diagram of FIG. 3, the entities and steps depicted in the hybrid diagram of FIG. 4 that share identifying numerals with the entities and steps depicted in the hybrid diagram of FIG. 2 are described in detail above in reference to FIG. 2. Further, method 400 is essentially identical or similar to method 200 up to the point at which registry 102 confirms 210 the registrar of record, except that, as in method 300, per method 400, registrant 202 also includes their existing blockchain user address in the request 206 assignment message. Therefore, description of method 400 proceeds by describing the features that are unique to method 400.

Per method 400, after registry 102 confirms 210 the registrar of record, instead of returning 212 the proof to registrar 104 as per methods 200 and 300, registry 102 may form a message and send 414 it to registry signature verification program 106. In particular, registry 102 may form a message that includes, for example, the proof, the domain name, and the address.

The remaining steps of method 400 are as described above in reference to method 200 of FIG. 2.

Figure 5:
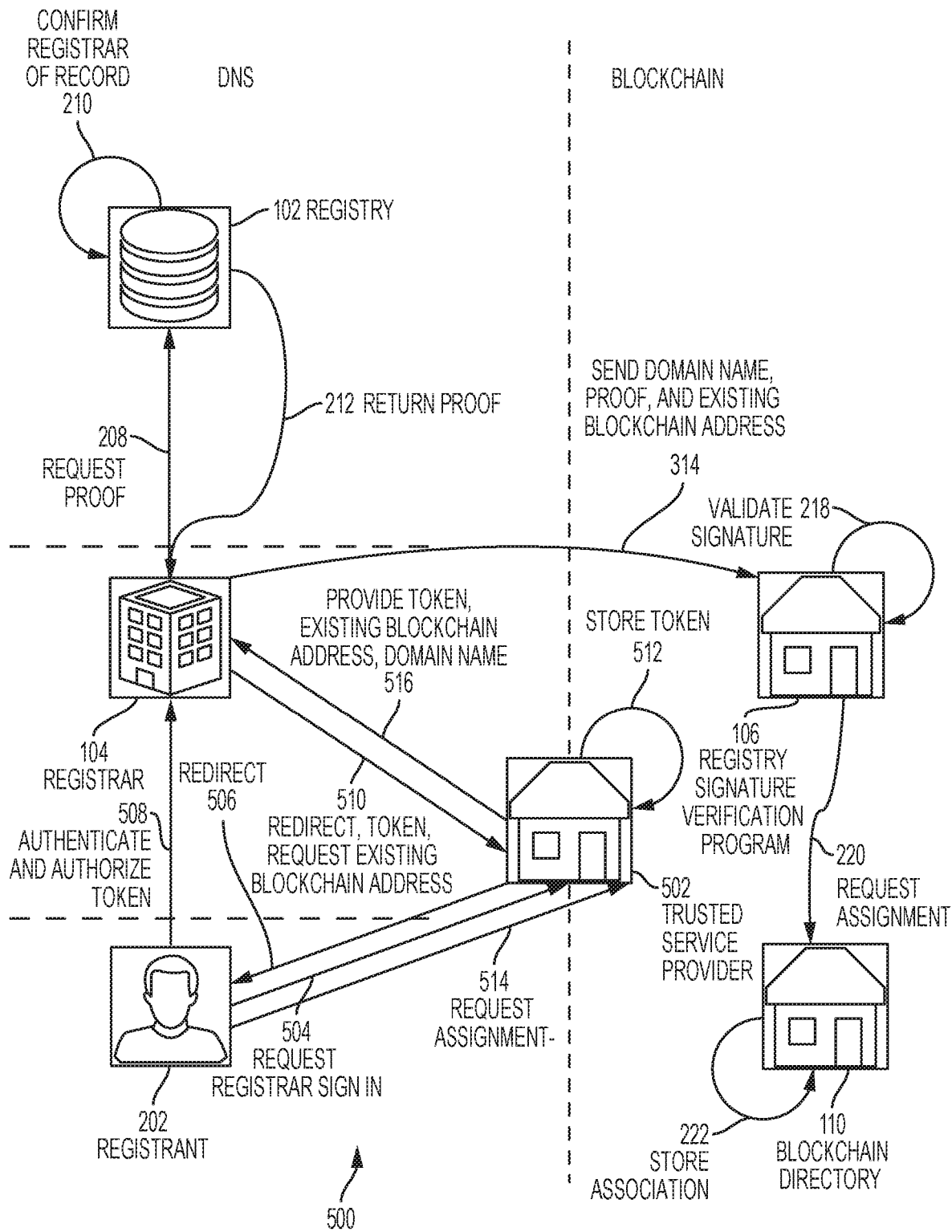
FIG. 5 is a hybrid diagram of a trusted service provider facilitated technique for assigning a DNS domain name registered to a registrant as a blockchain user address in a blockchain network according to various embodiments.

FIG. 5 is a hybrid diagram of a trusted service provider 502 facilitated method 500 for assigning a DNS domain name registered to a registrant as a blockchain user address in a blockchain network according to various embodiments. The trusted service provider 502 may be, for example, a DNS operator, a website hosting provider, a resolver, or a different type of service provider. Method 500 also involves registry 102, registrar 104, registry signature verification program 106, and blockchain directory 110, as described above in reference to FIGS. 1 and 2. Method 500 may be initiated by a registrant such as registrant 202. Some or all of the actions performed by registrant 202 in method 500 may be performed through or by the registrant's wallet according to some embodiments. According to other embodiments, the communications between registrant 202 and trusted service provider 502 may be performed through a web-based user interface provided by trusted service provider 502, which registrant 202 interacts with through a browser executing on registrant's client computer. In contrast to the basic embodiments of methods 200, 300, and 400, method 500 utilizes an authorization token, as explained presently.

Method 500 may begin with registrant 202 requesting 504 that trusted service provider 502 sign in to, or otherwise authenticate with, registrar 104. (As with other embodiments described herein, registrar 104 is the registrar of record of the domain name registered to registrant 202.) In response, trusted service provider 502 redirects 506 the registrant's browser to registrar 104, more particularly, to an authentication or sign in web page of registrar 104.

Next, per method 500, registrant 202 may sign in to, or otherwise authenticate 508 with, registrar 104. If registrant 202 does not already have an existing account with registrar 104, an account may be established by registrant 202 at this point before proceeding. The signing in (or authenticating) may include, for example, registrant 202 providing a user name and a password for their account with registrar 104. Further, registrant 202 may authorize 508 registrar 104 to generate an access token for use by trusted service provider 502 to facilitate the blockchain user name assignment. The access token may be, for example, an Open Authorization (OAuth) access token according to some embodiments.

Next, per method 500, trusted service provider 502 redirects 510 the registrant's browser back to trusted service provider 502, and also passes it the access token. Further, registrar 104 may request the existing blockchain user address of registrant 202 at this stage. According to an embodiment, trusted service provider 502 may store 512 the access token for future usage.

Either at this point in method 500, or previously in method 500, registrant 202 may request 514 that their registered domain name be assigned as their new blockchain user address. The request may include, for example, the existing blockchain user address of registrant 202, or registrant 202 may have previously provided that information to trusted service provider 502.

Once trusted service provider 502 has the access token and the existing blockchain user address of registrant 202, and registrant 202 has requested the assignment, trusted service provider 502 provides 516 the access token, the existing blockchain user address of registrant 202, and the domain name to registrar 104.

At this point in method 500, the remaining steps are similar to those of method 300 as shown and described above in reference to FIG. 3.

Figure 6:
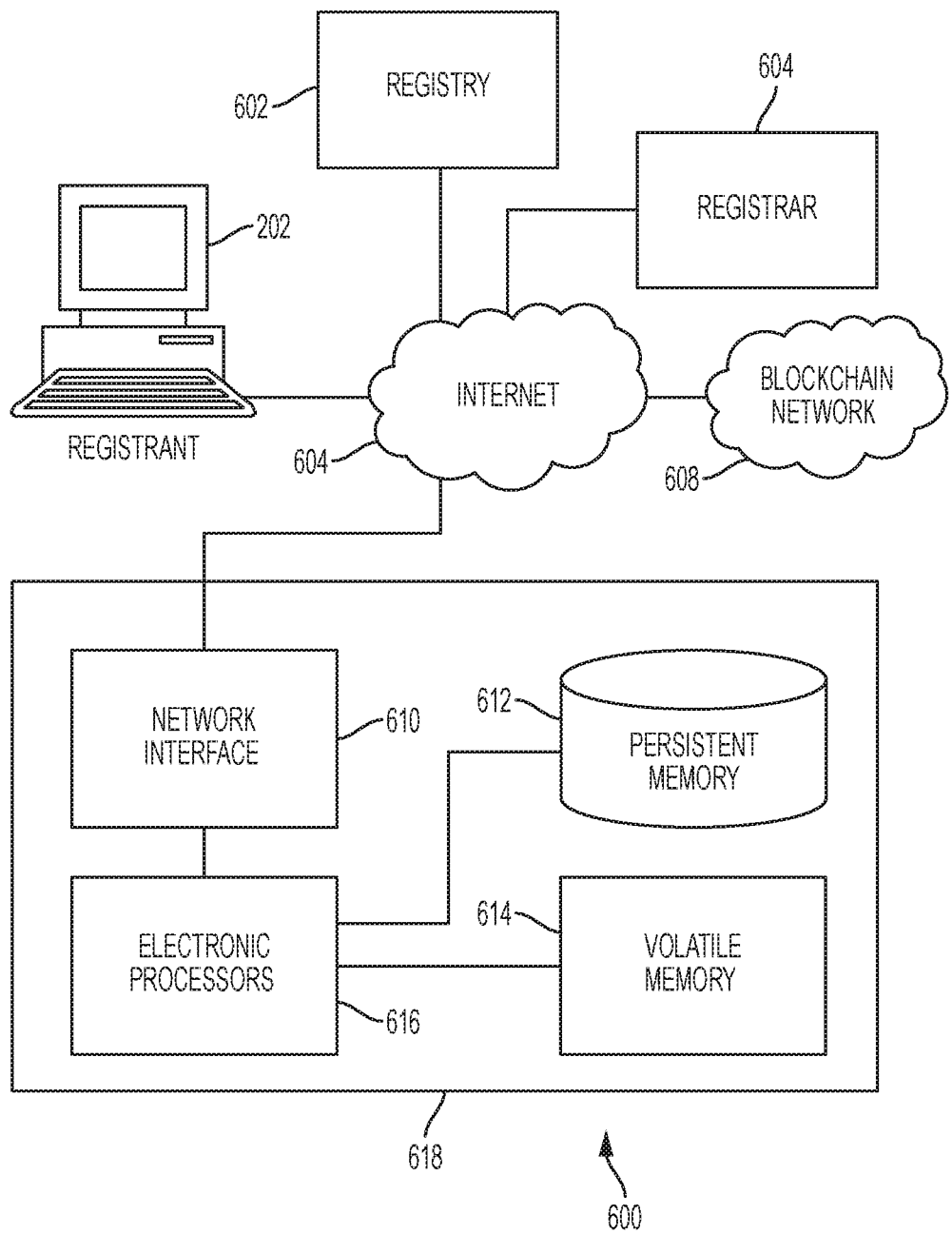
FIG. 6 is a schematic diagram of a server computer according to various embodiments.

FIG. 6 is a schematic diagram of a system 600 including server computer 618 according to various embodiments. System 600 includes, for example, registrant 202 (identified with their computer), DNS registry 602, DNS registrar 604, and server computer 618, all communicatively coupled to the internet 604. System 600 may also include blockchain network 608, which itself may include a plurality of networked nodes, which themselves may be networked through the internet 604. Server computer 618 may be, for example, a server computer of registry 102, registrar 104, or trusted service provider 502, according to various embodiments. Registry 602 may be registry 102, and/or registrar 604 may be registrar 104, consistent with server computer 618 being either registry 102 or registrar 104, according to various embodiments. That is, FIG. 6 is intended to display the various components networked together, as well as the internal workings of a server computer consistent with the various, e.g., registry and registrar, servers disclosed herein.

Server computer 618 may include network interface 610 to communicatively couple to the internet 604. Network interface 610 may include a physical network interface, such as a network adapter. Server computer 618 may be a special-purpose computer, adapted for reliability and high-bandwidth communications. Thus, server computer 618 may be embodied in a cluster of individual hardware server computers, for example. Alternately, or in addition, server computer 618 may include redundant power supplies. Persistent memory 612 may be in a Redundant Array of Inexpensive Disk drives (RAID) configuration for added reliability, and volatile memory 614 may be or include Error-Correcting Code (ECC) memory hardware devices. Server computer 618 further includes one or more electronic processors 616, which may be multi-core processors suitable for handling large amounts of information. Electronic processors 616 are communicatively coupled to persistent memory 612, and may execute instructions stored thereon to at least partially effectuate the techniques, functions, and operations disclosed herein, e.g., method 100 as shown and described above in reference to FIG. 1, method 200 as shown and described in reference to FIG. 2, method 300 as shown and described in reference to FIG. 3, method 400 as shown and described in reference to FIG. 4, method 500 as shown and described in reference to FIG. 5, and any variation, modification, or alternate methods as described in the following section. Electronic processors 616 are also communicatively coupled to volatile memory 614.

IV. Variations, Modifications, and Alternate Embodiments

Many variations on the disclosed embodiments are possible. Some example variations and modifications are presented below.

A. Higher Level Domain Names

Some embodiments permit assigning domain names that include second-level (and higher-level) domain names as blockchain user addresses in a blockchain network. For example, an entity may own the domain name example.com. As such, the entity also owns any domain names that include second or higher level domain names under the domain name example.com. Thus, the same entity may own first.example.com, big.example.com, purple.example.com, etc. Such an entity may use method 100 and any of methods 200, 300, 400, or 500, in the stead of registrant 202, to assign domain names that include second or higher level domain names under example.com as blockchain addresses for anyone, not limited to the entity themselves. Thus, the entity that owns example.com may have a web-based business that provides blockchain name assignments to its customers. The entity, rather than its customers, may receive a customer's existing blockchain address and proceed to use any of methods 200, 300, 400, or 500 to assign a domain name that includes a second or higher level domain name under example.com to the customer. Either the entity or the customer may choose the second level (and/or higher) domain name. Note that because the entity owns example.com, it can ensure that the registry of record proof procedure described herein is accomplished in order to assign such subdomain names.

B. Registrant Confirmation Via Wallet

Some embodiments await confirmation from the registrant prior to finalizing the assignment of a domain name as a blockchain address. Any of the disclosed embodiments may implement this variation. For purposes of description rather than limitation, an example embodiment is described relative to method 400 of FIG. 4, with the differences disclosed and explained presently. In such embodiments, the optional step of registrant 202 signing 204 their existing address using their blockchain private key to create a proof of blockchain user address ownership may be omitted. Once registry signature verification program 106 receives the domain name, proof, and existing blockchain address sent 414 from registry 102, and once registry signature verification program 106 validates 218 the signature on the proof, it stores a "holding record" in the blockchain, where the holding record may include, or include references to, the domain name at issue and the registrant's existing blockchain address. In such embodiments, registry signature verification program 106 awaits confirmation to assign the domain name from registrant 202 before proceeding to request 220 assignment from blockchain directory 110. Registrant 202 may provide such confirmation through the registrant's wallet.

In more detail, the electronic wallet may include functionality that detects whether registrant 202 confirmation is required and permits registrant 202 to send such a confirmation to registry signature verification program 106. To detect the registrant 202 confirmation requirement, the wallet may interact with the blockchain, and/or with registry signature verification program 106 to retrieve any pending holding records relevant to registrant 202. The wallet may use the detection of any retrieved holding records that match the existing blockchain address, or registered domain name, of registrant 202, as an initiation to prompt registrant 202 for confirmation. For example, the wallet may display a virtual button labeled using information from the holding record, e.g., "Claim domain name example.com as your blockchain address instead of 0x987 . . . ?", where the actual blockchain user address may be presented. Upon registrant 202 providing confirmation via their wallet to registry signature verification program 106, it proceeds to request 220 assignment of the domain name as the blockchain address of registrant 202.

Embodiments that utilize registrant confirmation may thwart or prevent registrant 202 from assigning their domain name as a blockchain address for another blockchain network participant.

C. Registrant Confirmation Via Voiceprint

According to some embodiments, registry 102 and/or registrar 104 may store voiceprints of some or all contacts attached to a domain name. In general, domain name registration involves providing, for example, the registrant's contact information to the registrar of record, which passes it to the respective registry. In some embodiments, the registration process may include the step of some (or all) contacts for the domain name providing voiceprints to the registrar. Such a voice print may be of a contact, such as registrar 202, saying the domain name itself. Registrar 104 may store and pass the received voiceprint(s) to registry 102 for storage. Registry 102 may set up and implement a new EPP extension for the purpose of accepting and storing voiceprints via its EPP interface.

Embodiments may utilize the stored voiceprints as follows. Registrar 104 may provide non-transitory computer executable code to manufacturers, supporting companies, or distributers of consumer voice-based computers that facilitates registrant 202 requesting 206 assignment of a domain name for a blockchain user address audibly. The code may be installed on such voice-based computers and, when executed, configure such computers to receive and process audible requests to request 206 assignment. An example, non-limiting format for such requests is, "computer, assign my domain name example.com as my blockchain address in blockchain X in place of address 0x987 . . . ". When a properly configured consumer voice-based computer receives such an audio command, it may proceed to form and send a request to registrar 104 as disclosed above in reference to methods 200, 300, 400, and 500. However, the request may further include, or be preceded or followed by, a request that includes the voiceprint of registrant 202, e.g., the portion of the voiceprint representing the audible domain name itself. Registrar 104 may receive the request and process it as disclosed in reference to methods 200, 300, 400, and 500, after it has successfully verified a match between the received voiceprint and a stored voiceprint. The matching process may be a probabilistic matching process that outputs a probability of a match, and the method may proceed if the output probability exceeds a predetermined or preset threshold, e.g., at least a 95% probability of a match.

According to some embodiments, instead of registrar 104 detecting a voiceprint match, registrar 104 instead passes the received voiceprint to registry 102, which performs the verification of the match between the received voiceprint and a stored voiceprint, and provides the results back to registrar 104. In such embodiments, the remainder of the steps are similar or essentially identical to those of methods 200, 300, 400, and 500 once registry 102 has verified the voiceprint match.

D. Other Identifiers as Blockchain User Addresses

Some embodiments assign an identifier other than a domain name as a blockchain user address in a blockchain network. Examples of such identifiers include, but are not limited to, telephone numbers and email addresses. Such embodiments differ from the embodiments disclosed herein in Sections II and III as follows. The identifier holder, e.g., the telephone number owner or email address user, takes the place of registrant 202. The entity that provides the identifier, e.g., a phone company for a telephone number or an email provider for an email identifier, takes the place of registry 102. A facilitating company may take the place of registrar 104. The facilitating company may have or may establish a communication channel with the entity that provides the identifier, e.g., the entity that provides the identifier has an internet-based interface or API.

For the setup phase of such embodiments, method 100 proceeds as disclosed above in Section II, except that the entity that provides the identifier performs the actions of registry 102, and the facilitating company performs the actions of registrar 104. Instead of registry 102 adding support for a registrar of record proof EPP extension, the entity that provides the identifier provides support for responding to requests 208 for proof sent by the facilitating company. The requests may be sent through the communication channel between the entity that provides the identifier and the facilitating company. In such embodiments, the entity that provides the identifier obtains and utilizes a proof key pair as disclosed above in Section III. The registry signature verification program 106 may be configured to verify the signatures by the entity that provides the identifier, rather than signatures by registry 102. The signatures may be on data that specifies an identifier such as a phone number or email address and an existing blockchain address, instead of on data that specifies a domain name and an existing blockchain user address.

For the execution phase of such embodiments, the entity that provides the identifier performs the actions of registry 102, and the facilitating company performs the actions of registrar 104. Any of methods 200, 300, 400, or 500 may be altered as described presently. The identifier holder, instead of registrant 202, requests 206 assignment of their identifier as a blockchain user address. The facilitating company receives the request and requests 208 proof from the entity that provides the identifier. The remaining flow is as described above in Section II for any of methods 200, 300, 400, or 500, mutatis mutandis.

According to some embodiments, the facilitating company may be merged with the entity that provides the identifier. In such embodiments, the entity that provides the identifier may establish an interface that performs the analogous actions of registrar 104. Further, the request 208 for proof may be performed essentially in-house. Such embodiments perform as described herein, except that communications 208, 210, and 212 are performed by different portions of the same entity, rather than by different entities.

Embodiments disclosed in this subsection may have the added benefit of enabling secure two-factor identification by consulting the blockchain for a given blockchain network participant's address to fetch additional factors for use to verify their identity. For example, if a given address on a blockchain has an attached phone number or email address, those could be consulted on chain as a source to send a message to, to confirm proof of address ownership.

Further, embodiments disclosed in this subsection may be particularly beneficial to payment providers and their users. As used herein, the term "payment provider" refers to any entity that provides customer accounts to customers that permit such customers to send to and receive payment from other customers using customer identifiers instead of banking information. For example, a payment provider may enable its customers to send and receive money amongst themselves by specifying domain names and currently amounts. In particular, a first customer may log into a payment provider webpage interface by providing a domain name and password, then provide to the interface a domain name of a second customer, as well as a US dollar amount, along with instructions to pay, and the payment provider may respond to such instruction by moving currency between customer accounts as instructed. According to embodiments described in this subsection, a payment provider may assign an existing payment provider identifier (e.g., domain name) as blockchain address. In this way, a payment provider customer may broadcast, publish, or otherwise make known a central payment identifier, e.g., their domain name, along with instructions that the customer may receive payment through such identifier either by way of the standard techniques of the payment provider, or via cryptocurrency using a cryptocurrency blockchain network using the same identifier, e.g., domain name.

Certain embodiments can be performed using a computer program or set of programs. The computer programs can exist in a variety of forms both active and inactive. For example, the computer programs can exist as software program(s) comprised of program instructions in source code, object code, executable code or other formats; firmware program(s), or hardware description language (HDL) files. Any of the above can be embodied on a transitory or non-transitory computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method can be performed in a different order than illustrated or simultaneously. Those skilled in the art will recognize that these and other variations are possible within the spirit and scope as defined in the following claims and their equivalents.

What is claimed is:

1. A domain name system (DNS) registry facilitated method of assigning a domain name registered to a registrant as a blockchain address in a blockchain network, the method comprising:

obtaining, by the DNS registry for the domain name, a cryptographic asymmetric proof key pair comprising a public key and a private key;

providing, by the DNS registry, the public key and a computer executable registry signature verification program for addition to a block in a blockchain of the blockchain network, wherein the registry signature verification program is configured to use the public key to validate signatures made using the private key;

receiving, by the DNS registry, a request for a proof of registrar of record for the domain name from a registrar, wherein the request comprises the domain name;

confirming, by the DNS registry, that the registrar is a registrar of record for the domain name;

providing, by the DNS registry, a proof of registration message, wherein the proof of registration message comprises a signature by the private key and confirms that the registrar is a registrar of record for the domain name;

whereby the registry signature verification program validates the signature using the public key, and whereby the blockchain network receives and stores in the blockchain an association between the domain name and an existing blockchain address for the registrant.

2. The method of claim 1, further comprising:
using the private key, signing, by the DNS registry, a top level domain name corresponding to the domain name and a blockchain address of the registry signature verification program to form a message; and
providing the message to the blockchain network for inclusion in the blockchain.

3. The method of claim 1, wherein the providing, by the DNS registry, the proof of registration message comprises providing, by the DNS registry, the domain name, the existing blockchain address for the registrant, and the proof of registration message to the blockchain network for processing by the registry signature verification program.

4. The method of claim 1, wherein the registry signature verification program is further configured to await confirmation sent from an electronic wallet of the registrant before requesting assignment of the domain name as a blockchain address of the registrant in the blockchain network.

5. The method of claim 1, further comprising:
storing in persistent memory a voiceprint of a contact for a registration of the domain name;
receiving a request to verify a new voiceprint;
verifying the new voiceprint by matching to the voiceprint of the contact for the registration of the domain name; and
providing a voiceprint verification to the registrar.

6. The method of claim 1, wherein the blockchain address comprises a public key of the registrant.

7. A domain name system (DNS) registrar facilitated method of assigning a domain name registered to a registrant as a blockchain address in a blockchain network, the method comprising:
sending, by a DNS registrar for the domain name, and to a DNS registry for the domain name, a request for a proof of registrar of record for the domain name, wherein the request comprises the domain name;
receiving, by the DNS registrar, and from the DNS registry, a proof of registration message, wherein the proof of registration message comprises a signature by a private key of the registry and confirms that the DNS registrar is a registrar of record for the domain name; and
sending, by the DNS registrar, and to the blockchain network, a request to assign the domain name as a blockchain address for the registrant, whereby a node in the blockchain network validates the signature using a public key corresponding to the private key and stores an association between the domain name and an existing blockchain address for the registrant.

8. The method of claim 7, further comprising, prior to the sending the request for a proof of registrar of record for the domain name:
receiving, by the DNS registrar for the domain name, a request for an access token, wherein the request comprises a browser redirection from a service provider from which the registrant has requested that the domain name be assigned as a blockchain address of the registrant in the blockchain network;
authenticating, by the DNS registrar, the registrant;
responding to the request, by the DNS registrar, with an access token and a redirection back to the service provider; and
receiving, by the DNS registrar, the access token, the domain name, and an existing blockchain address for the registrant.

9. The method of claim 8, further comprising, prior to the sending the request for a proof of registrar of record for the domain name, receiving, by the DNS registrar, and from the registrant, a request to assign the domain name as a blockchain address of the registrant in the blockchain network.

10. The method of claim 9, wherein the request to assign the domain name as a blockchain address of the registrant in the blockchain network is derived from an audio command provided by the registrant.

11. The method of claim 7, wherein the sending, by the DNS registrar, and to the blockchain network, the request to assign the domain name as a blockchain address for the registrant, further comprises sending the request to a node in the blockchain network that comprises a computer executable registry signature verification program configured to validate registry signatures and receive an authorization message originated by an electronic wallet of the registrant prior to it sending a request to assign the domain name as a blockchain address for the registrant in the blockchain network.

12. A domain name system (DNS) registry system configured to assign a domain name registered to a registrant as a blockchain address in a blockchain network, the DNS registry system comprising:
at least one electronic server computer communicatively coupled to the internet and to an electronic persistent storage device, the electronic persistent storage device storing a cryptographic asymmetric proof key pair comprising a public key and a private key, the at least one electronic server computer configured to provide the public key and a computer executable registry signature verification program to the blockchain network for addition to a block in a blockchain of the blockchain network, wherein the registry signature verification program is configured to use the public key to validate signatures made using the private key; and
an Extensible Provisioning Protocol (EPP) interface communicatively coupled to the internet and the at least one electronic server computer and configured to respond to a request for a proof of registrar of record for the domain name, wherein the request comprises the domain name, received from a registrar, by confirming that the registrar is a registrar of record for the domain name and then providing a proof of registration message confirming that the registrar is a registrar of record for the domain name, wherein the proof of registration message comprises a signature by the private key, whereby the blockchain network receives and stores in the blockchain an association between the domain name and an existing blockchain address for the registrant after the registry signature verification program obtains and validates the signature using the public key.

13. The DNS registry system of claim 12, wherein the at least one electronic server computer is further configured to sign, using the private key, a top level domain name corresponding to the domain name and a blockchain address of the registry signature verification program to form a message and provide the message to the blockchain network for inclusion in the blockchain.

14. The DNS registry system of claim 12, wherein the EPP interface is further configured to respond to the request for a proof of registrar of record for the domain name by confirming that the registrar is a registrar of record for the domain name and then providing the proof of registration message, the domain name, and the existing blockchain address for the registrant to the blockchain network for processing by the registry signature verification program.

15. The DNS registry system of claim 12 wherein the registry signature verification program is further configured to await confirmation sent from an electronic wallet of the registrant before requesting assignment of the domain name as a blockchain address of the registrant in the blockchain network.

16. The DNS registry system of claim 12, wherein the registry is further configured to:
store in persistent memory a voiceprint of a contact for a registration of the domain name;
receive a request to verify a new voiceprint;
verify the new voiceprint by matching to the voiceprint of the contact for the registration of the domain name; and
provide a voiceprint verification to the registrar.

17. A domain name system (DNS) registrar system configured to assign a domain name registered to a registrant by the registrar as a blockchain address in a blockchain network, the DNS registrar system comprising at least one electronic server computer communicatively coupled to the internet and configured to perform a method comprising:
sending, to a DNS registry for the domain name, a request for a proof of registrar of record for the domain name, wherein the request comprises the domain name;
receiving, from the DNS registry, a proof of registration message confirming that the registrar is a registrar of record for the domain name, wherein the proof of registration message comprises a signature by a private key of the registry; and
sending, to the blockchain network, a request to assign the domain name as a blockchain address for the registrant, whereby a node in the blockchain network validates the signature using a public key corresponding to the private key and stores an association between the domain name and an existing blockchain address for the registrant.

18. The DNS registrar system of claim 17, wherein the at least one electronic server computer is further configured to perform, prior to the sending the request for a proof of registrar of record for the domain name:
receiving a request for an access token, wherein the request comprises a browser redirection from a service provider from which the registrant has requested that the domain name be assigned as a blockchain address of the registrant in the blockchain network;
authenticating the registrant;
responding to the request with an access token and a redirection back to the service provider; and
receiving, from the service provider, the access token, the domain name, and an existing blockchain address for the registrant.

19. The DNS registrar system of claim 17, wherein the sending, to the blockchain network, the request to assign the domain name as a blockchain address for the registrant, further comprises sending the request to a node in the blockchain network that comprises a computer executable registry signature verification program configured to validate registry signatures and receive an authorization message originated by an electronic wallet of the registrant prior to it sending a request to assign the domain name as a blockchain address for the registrant in the blockchain network.

20. The DNS registrar system of claim 17, wherein the at least one electronic server computer is further configured to perform, prior to the sending the request for a proof of registrar of record for the domain name, receiving, from the registrant, a request to assign the domain name as a blockchain address of the registrant in the blockchain network.

21. The DNS registrar system of claim 20, wherein the request to assign the domain name as a blockchain address of the registrant in the blockchain network is derived from an audio command.

\* \* \* \* \*